J. A. WATSON.
Baking-Stand

No. 165,899. Patented July 20, 1875.

WITNESSES:
INVENTOR:
Jno. A. Watson
BY
ATTORNEYS.

UNITED STATES PATENT OFFICE.

JOHN A. WATSON, OF LEXINGTON, MISSISSIPPI.

IMPROVEMENT IN BAKING-STANDS.

Specification forming part of Letters Patent No. 165,899, dated July 20, 1875; application filed June 12, 1875.

*To all whom it may concern:*

Be it known that I, JOHN A. WATSON, of Lexington, in the county of Holmes and State of Mississippi, have invented a new and Improved Baking-Stand; and I do hereby declare that the following is a full, clear, and exact description of the same, reference being had to the accompanying drawing, forming a part of this specification, in which—

Figure 1:
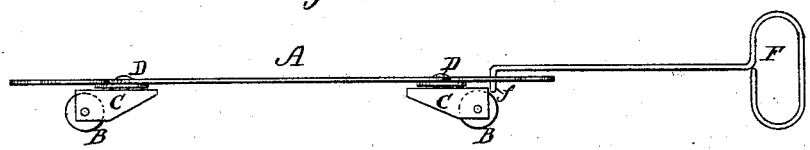
Figure 2:
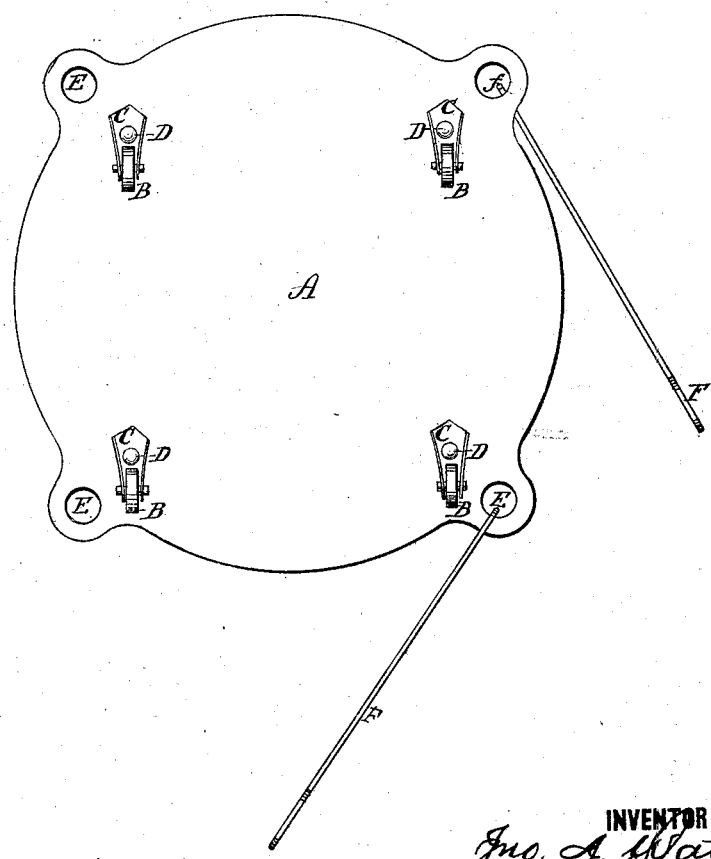

Figure 1 is a side elevation; Fig. 2 an underside view.

The invention relates to means whereby the baking-pans of stoves may be changed in position, and manipulated with facility, convenience, and without burning the hands.

The invention consists in a pan-stand, which will first be described in connection with drawing, and then pointed out in the claim.

A represents the stand, the upper surface of which is intended to receive the baking-pan, while the lower surface is provided with a number (preferably four) of caster-wheels or rollers, B. The latter are journaled in a bearing, C, that is swiveled on a pivot-pin or bolt, D. E are a series of holes, (preferably four,) placed at intervals near the edge of stand, and receiving the loop *f* of hand-rods F.

This baking-stand and hooks are to be used with the ordinary cooking-stove or bake-ovens, and to be constructed of zinc, sheet-iron, soapstone, and probably other material. It may also embrace a variety of patterns and sizes, and be more or less elevated, according to the size of the casters. The hooks are to be made of a convenient length, say, from one and a half to four feet, for the convenience of turning the stand and changing its position while in the hot oven. This avoids the necessity of thrusting the hand into the hot stove-oven, for the purpose of moving and changing the baking-pan from one position to another, and also the frequent burning of the hands through the intense heat of the oven; also, the jar or jolting incident to moving hot baking-pans with the hands, my little stand running smoothly over the floor of the oven.

I am aware that it is not broadly new to provide a baking-stand with rollers, or to turn it by a single handle to a certain extent; but

What I claim is—

The combination of baking-stand A, having perforated peripheral projections, the loop-rods F, the swiveled bearings C, and rollers B, all arranged to operate as and for the purpose specified.

JOHN ARCHIBALD WATSON.

Witnesses:
H. F. WILLIS,
J. H. LEVY.